United States Patent
Kim (10) Patent No.: US 10,209,423 B2
(45) Date of Patent: Feb. 19, 2019

(54) BACKLIGHT UNIT AND DISPLAY DEVICE HAVING THE SAME

(71) Applicant: Samsung Display Co., Ltd., Yongin-Si, Gyeonggi-Do (KR)

(72) Inventor: Tae-chang Kim, Anyang-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 380 days.

(21) Appl. No.: 15/218,254

(22) Filed: Jul. 25, 2016

(65) Prior Publication Data

US 2017/0168215 A1 Jun. 15, 2017

(30) Foreign Application Priority Data

Dec. 10, 2015 (KR) .................. 10-2015-0176081

(51) Int. Cl.
*F21V 8/00* (2006.01)

(52) U.S. Cl.
CPC ......... *G02B 6/0023* (2013.01); *G02B 6/0046* (2013.01); *G02B 6/0068* (2013.01); *G02B 6/0088* (2013.01)

(58) Field of Classification Search
CPC .. G02B 6/0023; G02B 6/0046; G02B 6/0088; G02B 6/0068
See application file for complete search history.

(56) References Cited

U.S. PATENT DOCUMENTS

| | | | | |
|---|---|---|---|---|
| 8,310,620 | B2* | 11/2012 | Yabe | G02B 6/002 349/61 |
| 8,829,539 | B2* | 9/2014 | Kleo | B32B 17/10018 257/82 |
| 2008/0002099 | A1* | 1/2008 | Oh | G02B 6/0091 349/65 |
| 2010/0141865 | A1* | 6/2010 | Jung | G02B 6/0091 349/61 |
| 2011/0149203 | A1* | 6/2011 | Kim | G02B 6/002 349/62 |
| 2013/0044511 | A1* | 2/2013 | Motooka | G02B 6/0013 362/606 |

(Continued)

FOREIGN PATENT DOCUMENTS

JP 2005321586 A 11/2005
JP 2007250197 A 9/2007

(Continued)

*Primary Examiner* — William N Harris
(74) *Attorney, Agent, or Firm* — Cantor Colburn LLP (57) ABSTRACT

A display device includes a backlight unit which includes a substrate defining a width thereof in a first direction and a length thereof in a second direction crossing the first direction; light sources mounted on the substrate and arranged in the second direction and spaced apart from each other, each light source generating light and emitting the light in the first direction; a first light blocking layer disposed spaced apart from the light sources in the first direction by a first distance and facing the light sources; and an adhesive member provided in plural arranged in the second direction and spaced apart from each other, the adhesive members disposed spaced apart from the first light blocking layer in a direction opposite to the first direction by a second distance smaller than the first distance, and alternately arranged with the light sources in a zigzag shape.

21 Claims, 6 Drawing Sheets

(56) References Cited

U.S. PATENT DOCUMENTS

2014/0016349 A1    1/2014  Minoura
2015/0124197 A1*   5/2015  Yeom .................... G02B 6/0091
                                                        349/65
2015/0247968 A1*   9/2015  Verrat-Debailleul .......................
                                                        B60Q 3/208
                                                        362/612

FOREIGN PATENT DOCUMENTS

KR         1020110132801  A    12/2011
KR            10-1182558  B1    9/2012

* cited by examiner

BACKLIGHT UNIT AND DISPLAY DEVICE HAVING THE SAME

This application claims priority to Korean Patent Application No. 10-2015-0176081, filed on Dec. 10, 2015, and all the benefits accruing therefrom under 35 U.S.C. § 119, the content of which in its entirety is herein incorporated by reference.

BACKGROUND

1. Field

The invention relates to a backlight unit and a display device having the backlight unit.

2. Description of the Related Art

Various display devices, such as a liquid crystal display device, an electrowetting display device, an electrohporetic display device, etc., are widely used. Each of the display devices includes a light-receiving type display panel and a backlight unit which provides a light to the display panel.

The backlight unit is classified into an edge-illumination type backlight unit and a direct-illumination type backlight unit according to a position of a light source, e.g., a light emitting diode, with respect to a display surface of the display panel on which an image is displayed.

The edge-illumination type backlight unit has an overall thickness smaller than that of the direct-illumination type backlight unit. Accordingly, a mobile display device mainly employs the edge-illumination type backlight unit as a light source thereof.

SUMMARY

One or more exemplary embodiment of the invention provides a backlight unit capable of uniformly providing a light.

One or more exemplary embodiment of the invention provides a display device capable of improving a display quality.

Exemplary embodiments of the invention provide a display device including a display panel which receives a light to display an image, a light guide plate which guides the light to the display panel, and a light source unit which generates and provides the light to the light guide plate and is disposed at a side surface of the light guide plate.

The light source unit includes a substrate defining a width thereof in a first direction and a length thereof in a second direction crossing the first direction, the substrate including first, second and third areas sequentially arranged in the first direction, light sources disposed in the first area and arranged along a second direction crossing the first direction, an adhesive member disposed in the second area and projected between the light sources adjacent to each other among the light sources in a direction opposite to the first direction, and a first light blocking member disposed in the third area to face the light sources.

The light guide plate may define a light incident surface thereof facing the light sources, a light output surface thereof facing the display panel and from which the light exits, and an opposite surface thereof opposing the light output surface.

The opposite surface may define a first surface thereof overlapped with the third area and spaced apart from the light output surface by a first distance in a third direction perpendicular to the first and second directions, a second surface thereof overlapped with the second area and spaced apart from the light output surface by a second distance greater than the first distance in the third direction, and a third surface thereof connecting the first and second surfaces to each other and inclined with respect to the second surface.

The display device may further include the adhesive member provided in a plural separated from each other in the second direction, and the adhesive members may be alternately arranged with the light sources in a zigzag shape in a top plan view. The adhesive member may directly contact the second surface.

The first light blocking member may directly contact the first surface. The first light blocking member may have a thickness equal to a distance between the first surface and the substrate. The first light blocking member may be a film or a double-sided tape and include a color material. The first light blocking member may define a length thereof which extends in the second direction.

The display device may further include a bottom chassis in which is accommodated the light guide plate and the light source unit.

The bottom chassis may define a bottom portion thereof overlapped with the display panel. The bottom portion may be extended bent toward the display panel to define a sidewall portion of the bottom chassis.

The bottom portion may define a first portion thereof overlapped with the first surface of the opposite surface of the light guide plate; a second portion thereof overlapped with the second surface of the opposite surface of the light guide plate and on which is accommodated the light source unit; and a third portion thereof extended between the first and second portions to connect the first and second portions to each other, where the third portion inclined with respect to the second portion. The third portion may face the third surface.

The sidewall portion of the bottom chassis may extend bent to define a cover portion of the bottom chassis, and the cover portion may be disposed overlapping the light source unit. The bottom chassis may include a reflective material.

The first light blocking member may be provided in plural. The first light blocking members may be arranged in the second direction and spaced apart from each other at regular intervals.

The display device may further include a second light blocking member and a reflective member.

The second light blocking member may be disposed on the light guide plate. A portion of the second light blocking member may be overlapped with the first light blocking member in a top plan view.

The reflective member may be disposed between the light source unit and the cover portion and between the light guide plate and the first light blocking member.

Exemplary embodiments of the invention provide a backlight unit including a light source unit which generates a light, a light guide plate which receives the light and guides the light to a display panel, and a bottom chassis on which is accommodated the light source unit and the light guide plate.

The light source unit may include a substrate which defines a width thereof in a first direction and a length thereof in a second direction crossing the first direction, where the substrate includes first, second and third areas sequentially arranged in the first direction, light sources disposed in the first area and arranged along the second direction, an adhesive member disposed in the second area and projected between the light sources adjacent to each other among the light sources in a direction opposite to the first direction, and a first light blocking member disposed in the third area to face the light sources.

The light guide plate may be overlapped with the second and third areas, in a third direction perpendicular to the first and second directions the light guide plate may have a first thickness in the third area and a second thickness in the second area, and the first thickness may be smaller than the second thickness.

In the third direction, the first light blocking member may have a minimum thickness greater than a difference between the first thickness and the second thickness of the light guide plate.

Exemplary embodiments of the invention provide a backlight unit including a substrate defining a width thereof in a first direction and a length thereof in a second direction crossing the first direction, light sources mounted on the substrate and arranged in the second direction and spaced apart from each other, each light source generating light and emitting the light in the first direction, a first light blocking layer disposed spaced apart from the light sources in the first direction by a first distance and facing the light sources, and an adhesive member provided in plural arranged in the second direction and spaced apart from each other, the adhesive members disposed spaced apart from the first light blocking layer in a direction opposite to the first direction by a second distance smaller than the first distance, and alternately arranged with the light sources in a zigzag shape.

In a third direction perpendicular to the first and second directions, from an upper surface of the substrate, a thickness of the light blocking member may be greater than a thickness of each of the adhesive members and smaller than a thickness of each light source.

According to one or more exemplary embodiment of the invention described above, the backlight unit reduces or effectively prevents the light from leaking from the light guide plate, and thus the backlight unit uniformly provides the light to the display panel.

According to one or more exemplary embodiment of the invention described above, the display device including the backlight unit may have improved display quality.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

Like numerals refer to like elements throughout. In the drawings, the thickness of layers, films, and regions are exaggerated for clarity. The use of the terms first, second, etc. do not denote any order or importance, but rather the terms first, second, etc. are used to distinguish one element from another.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary ten "below" or "beneath" can, therefore, encompass both an orientation of above and below Unless otherwise defined, all terms (including technical and scientific terms) used herein have the same meaning as commonly understood by one of ordinary skill in the art to which this disclosure belongs. it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the invention will be explained in detail with reference to the accompanying drawings.

Figure 1:
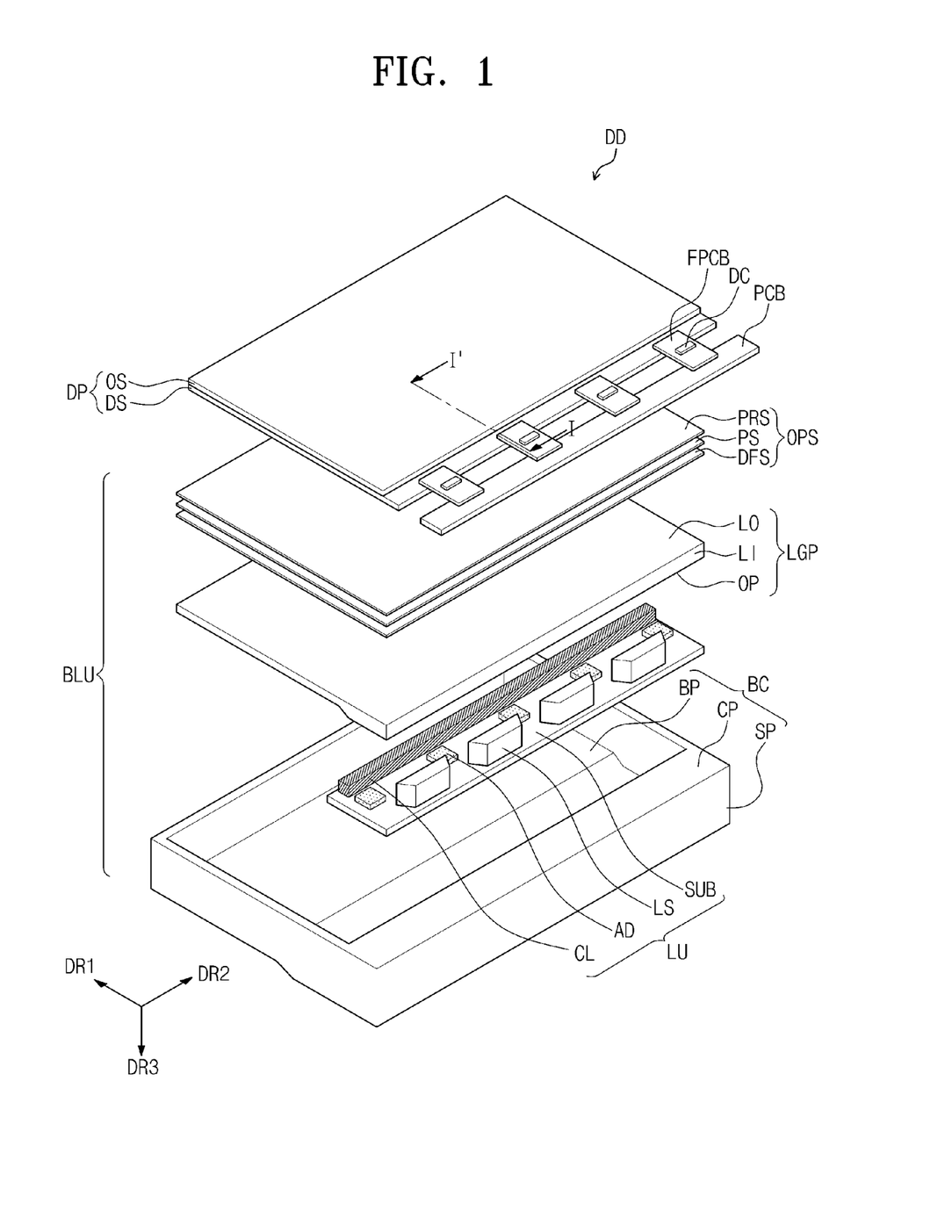
FIG. 1 is an exploded perspective view showing an exemplary embodiment of a display device according to the invention.
Figure 2:
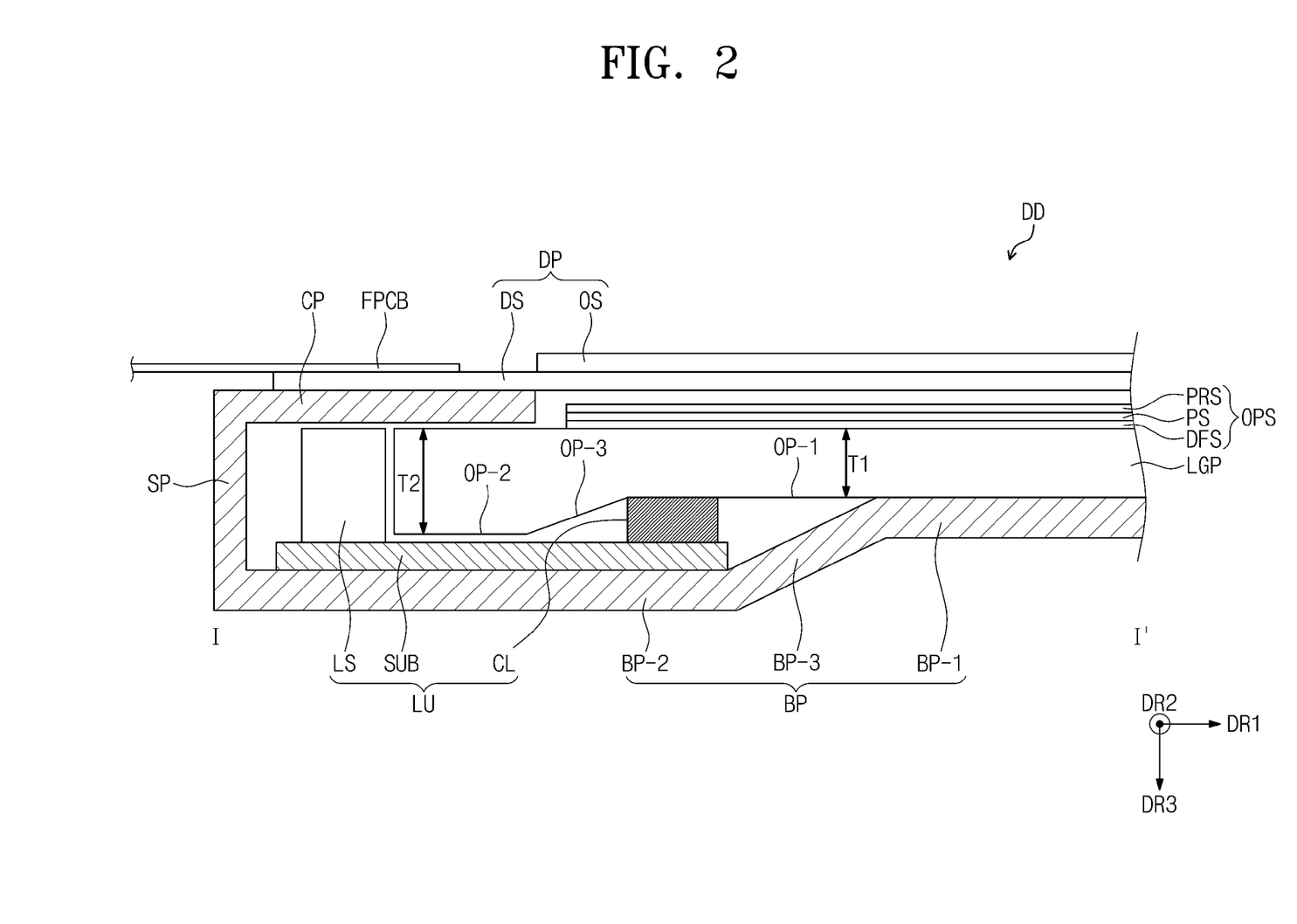
FIG. 2 is a cross-sectional view taken along line I-I' of FIG. 1.

FIG. 1 is an exploded perspective view showing an exemplary embodiment of a display device DD according to the invention and FIG. 2 is a cross-sectional view taken along line I-I' of FIG. 1.

Referring to FIGS. 1 and 2, the display device DD includes a display panel DP and a backlight unit BLU disposed under the display panel DP. For the convenience of explanation, a direction to which an image is displayed in the display device DD is referred to as an upper direction and a direction opposite to the upper direction is referred to as a lower direction. However, upper and lower directions are relative to each other.

The display panel DP displays the image with light provided from the backlight unit BLU. The display panel DP may be, but not limited to, a liquid crystal display panel, an electrowetting display panel, an electrophoretic display panel or a microelectromechanical system display panel. In the illustrated exemplary embodiment, the liquid crystal display panel will be described as the display panel DP.

The display panel DP has a substantially rectangular plate shape defined by two pairs of sides. In the illustrated exemplary embodiment, the display panel DP has a substantially rectangular shape defined by a pair of relatively short sides lengthwise extending in a first direction DR1 and a pair of relatively long sides lengthwise extending in a second direction DR2 substantially perpendicular to the first direction DR1.

The display panel DP includes a display substrate DS, an opposite substrate OS facing the display substrate DS, and a liquid crystal layer (not shown) interposed between the display substrate DS and the opposite substrate OS. When viewed in a top plan view, the display panel DP includes a display area in which the image is displayed and a non-display area surrounding the display area and in which the image is not displayed.

According to the illustrated exemplary embodiment, the display substrate DS includes a plurality of pixel electrodes (not shown) and a plurality of thin film transistors (not shown) which are electrically connected to the pixel electrodes in a one-to-one correspondence. Each thin film transistor is connected to a corresponding pixel electrode among the pixel electrodes to switch a driving signal applied to the corresponding pixel electrode.

The opposite substrate OS includes a common electrode (not shown) that forms an electric field in cooperation with the pixel electrodes to control an arrangement of liquid crystal molecules of the liquid crystal layer. The display panel DP operates the liquid crystal layer to display the image.

The display panel DP includes a driving chip DC applying the driving signal, a flexible printed circuit board FPCB on which the driving chip DC is mounted, and a printed circuit board FPCB which is electrically connected to the display panel DP through the flexible printed circuit board FPCB. In FIG. 1, the printed circuit board PCB is disposed in a same layer as (e.g., in a same plane as or coplanar with) the display panel DP, but the position of the printed circuit board PCB may be changed in accordance with the structure of the display device DD. In an exemplary embodiment, for instance, the printed circuit board PCB may be disposed on an outer surface of a bottom chassis BC described later. For the printed circuit board PCB to be disposed on the outer surface of the bottom chassis BC, the flexible printed circuit board FPCB is extended from the display panel DP to be bent along the outer surface of the bottom chassis BC to connect the display panel DP and the printed circuit board PCB each other. The driving chip DC generates the driving signal in response to an external signal provided thereto to drive the display panel DP. The external signal is provided from the printed circuit board PCB and includes an image signal, various control signals and a driving voltage.

In the illustrated exemplary embodiment, one printed circuit board PCB is provided, but the invention should not be limited thereto or thereby. That is, the printed circuit board PCB may be provided in a plural number, and the printed circuit boards PCB may be placed at different positions from each other. In addition, the printed circuit board PCB may be directly mounted on the display panel DP as a plurality of driving integrated circuit chips, if necessary.

The backlight unit BLU is disposed under the display panel DP to generate and provide a light to the display panel DP. The backlight unit BLU includes a light guide plate LGP, a light source unit LU, at least one optical sheet OPS and the bottom chassis BC.

The light guide plate LGP is disposed under the display panel DP to be adjacent to one side of the light source unit LU and guides the light incident thereto to the display panel DP. The light guide plate LGP includes a transparent polymer resin, e.g., polycarbonate, polymethyl methacrylate, etc.

The light guide plate LGP includes a light incident surface LI, a light output surface LO and an opposite surface OP. Side surfaces of the light guide plate LGP connect the light output surface LO and the opposite surface OP as two largest surfaces of the light guide plate LGP to each other. The light exiting from the light source unit LU is incident to the light guide plate LGP through the light incident surface LI of the light guide plate LGP. Where the light source unit LU is disposed to face at least one side surface among the side surfaces connecting the two largest surfaces of the light guide plate LGP, the one side surface corresponds to the light incident surface LI.

The light output surface LO corresponds to one surface among the two largest surfaces of the light guide plate LGP. The light output surface LO is a planar surface facing the display panel DP. The light incident to the light guide plate LGP through the light incident surface LI exits through the light output surface LO to travel to the display panel DP.

The opposite surface OP corresponds to the other surface among the two largest surfaces of the light guide plate LGP and faces the light output surface LO. The light incident to the light guide surface LI travels within the light guide plate LGP between the light output surface LO and the opposite surface OP thereof while being reflected between the light output surface LO and the opposite surface OP.

The opposite surface OP includes or defines a first surface OP-1 spaced apart from the light output surface LO toward a lower direction, e.g., a third direction DR3 substantially perpendicular to the first direction DR1 and the second direction DR2, by a first distance T1, a second surface OP-2 spaced apart from the light output surface LO toward the third direction DR3 by a second distance T2 greater than the first distance T1, and a third surface OP-3 connecting the first and second surfaces OP-1 and OP-2 to each other and being inclined with respect to the first and second surfaces OP-1 and OP-2. Here, the second surface OP-2 is connected to the light incident surface LI. The second surface OP-2 is disposed further in the third direction DR3 from the light output surface LO than the first surface OP-1. The first and second surfaces OP-1 and OP-2 are disposed in different planes from each other.

The light source unit LU generates the light. In the illustrated exemplary embodiment, the light source unit LU is disposed corresponding to one relatively long side of the display panel DP, but the invention should not be limited thereto or thereby. The light source unit LU may be provided in a plural number, and the light source units LU may be disposed corresponding to the relatively long side and/or the relatively short side of the display panel DP.

Hereinafter, the light source unit LU will be described in detail with reference to accompanying drawings.

Figure 3:
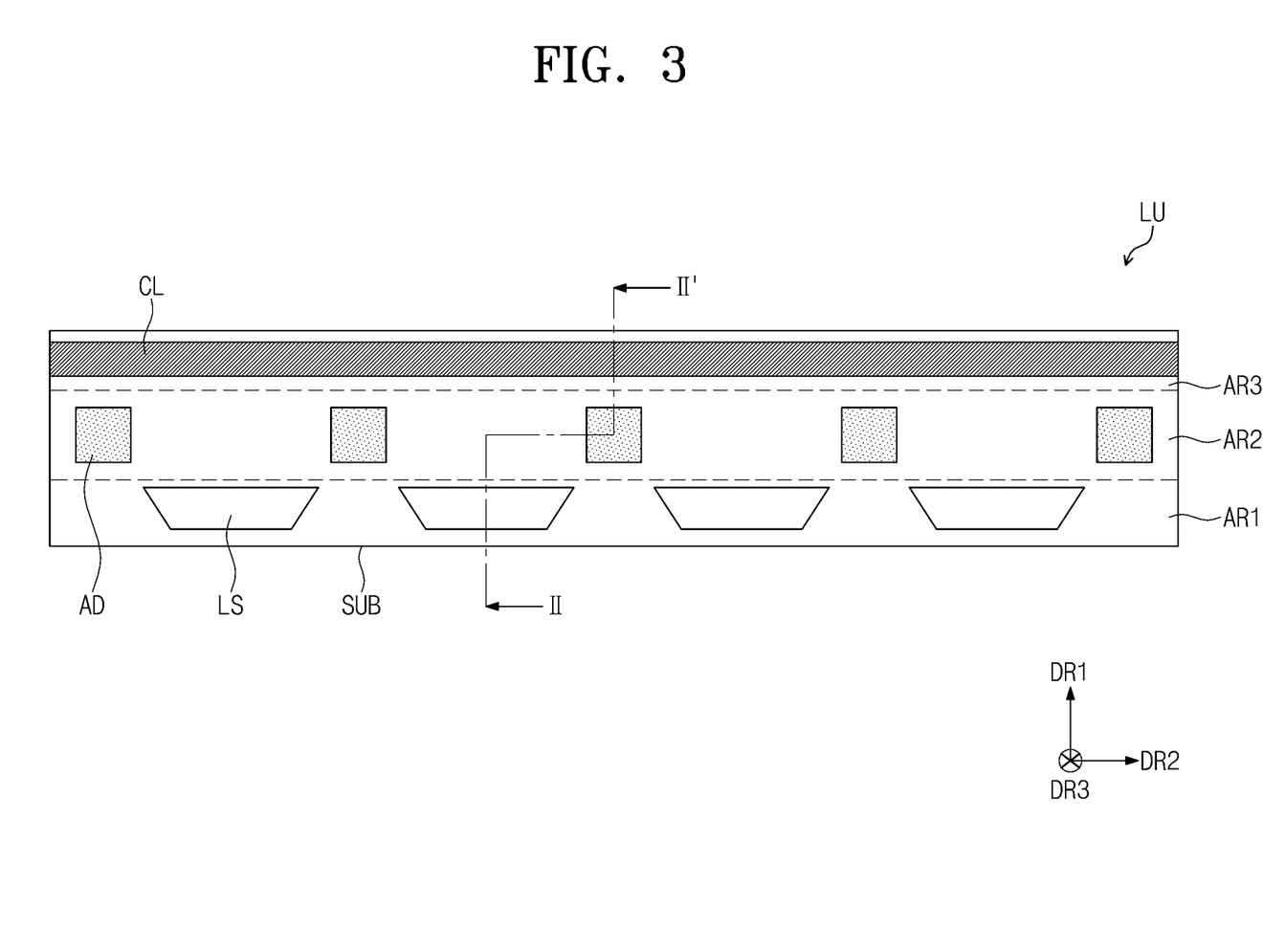
FIG. 3 is a top plan view showing an exemplary embodiment of a light source unit shown in the display device of FIG. 1.
Figure 4:
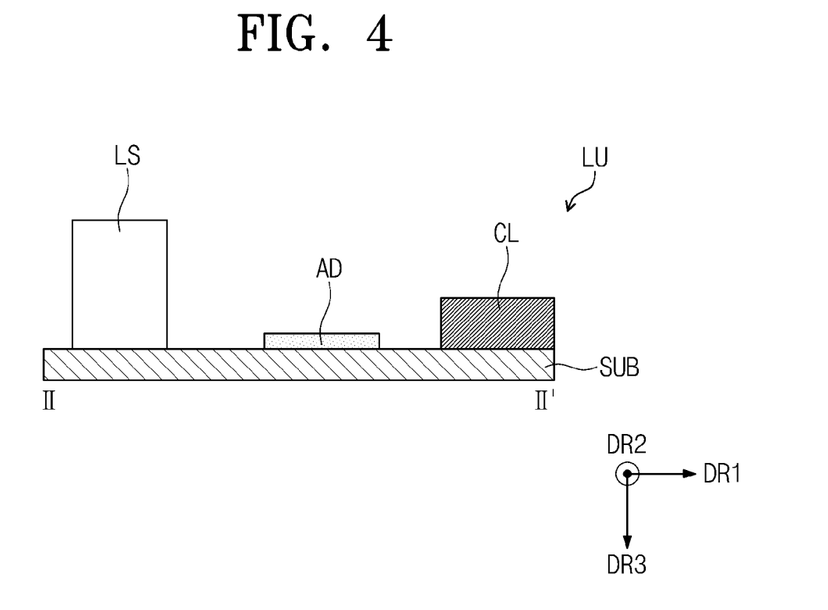
FIG. 4 is a cross-sectional view showing the light source unit taken along line II-IP of FIG. 3.

FIG. 3 is a plan view showing an exemplary embodiment of a light source unit of the display device shown in FIG. 1, and FIG. 4 is a cross-sectional view showing the light source unit taken along line II-II' of FIG. 3.

Referring to FIGS. 1 to 4, the light source unit LU includes a substrate SUB, a light source LS, an adhesive member AD and a coverlay CL. The light source LS and/or the adhesive member AD may be provided in plural within the light source unit LU.

The substrate SUB may be, but not limited to, a circuit substrate on which conductive lines for applying a power source to the light source LS are printed. In the illustrated exemplary embodiment, the substrate SUB has a substantially rectangular plate shape lengthwise elongated in the second direction DR2 while defining a width in the first direction DR1.

The substrate SUB is disposed between the light guide plate LGP and the bottom chassis BC. The substrate SUB includes or defines an upper surface which faces the light guide plate LGP. The upper surface includes or defines first, second and third areas AR1, AR2 and AR3. The first, second and third areas AR1, AR2 and AR3 are sequentially arranged in the first direction DR1. Each of the first, second and third areas AR1, AR2 and AR3 has a substantially rectangular shape lengthwise elongated in the second direction DR2 to correspond to the length of the substrate SUB. Each of the first, second and third areas AR1, AR2 and AR3 defines widths in the first direction DR1 larger than the lengths thereof in the second direction DR2.

The second area AR2 of the substrate SUB is overlapped with the second surface OP-2 and a portion of the third surfaces OP-3 of the light guide plate LGP, and the third area AR3 of the substrate SUB is overlapped with the first surface OP-1 and a remaining portion of the third surface OP-3 of the light guide plate LGP.

The substrate SUB includes a light source controller (not shown) connected to the light source LS. The light source controller (not shown) analyzes the image displayed on the display panel DP to output a local dimming signal and controls a brightness of the light source LS in response to the local dimming signal. The light source controller (not shown) may be mounted on a separate circuit board, and the position of the light source controller should not be limited to a specific position.

The light source LS may be mounted on the upper surface of the substrate SUB. The light source LS may be disposed above the first area AR1 of the substrate SUB.

The light generated and emitted from the light source LS is incident to the light guide plate LGP. The light source LS may be, but not limited to, a point light source, a linear line source or a surface light source. In the illustrated exemplary embodiment, a light emitting diode, which is the point light source, is used as the light source LS. FIG. 1 shows a plurality of light emitting diodes arranged on the substrate SUB in one line, but the arrangement of the light emitting diodes should not be limited thereto or thereby. That is, the light source LS may include one light emitting diode or a plurality of light emitting diode groups.

In the illustrated exemplary embodiment, the light sources LS are arranged in the first area AR1 and spaced apart from each other along the second direction DR2 at regular intervals. The light sources LS emits the light to the first direction DR1.

The adhesive member AD is disposed in such as being mounted on the second area AR2. In the second direction DR2, the adhesive member AD may be disposed between the light sources LS adjacent to each other among the light sources LS which are arranged relative to the adhesive member AD in a direction opposite to the first direction DR1. The adhesive member AD may be projected to between the light sources LS adjacent to each other in the direction opposite to the first direction DR1. The adhesive member AD is provided in a plural number, and the adhesive members AD are arranged in the second direction DR2 and spaced apart from each other. The adhesive members AD are arranged in staggered or zigzag shape with the light sources LS. In the first direction DR1, the adhesive member AD may be disposed to not overlap with the surface through which the light of the light source LS exits. Therefore, scattering by the adhesive member AD of the light emitted from the light source LS toward the first direction DR1 may be reduced or effectively prevented.

The adhesive member AD is disposed between the light guide plate LGP and the substrate SUB and contacts the second surface OP-2 of the light guide plate LGP. The adhesive member AD fixes the light guide plate LGP to the light source unit LU. The adhesive member AD may be, but not limited to, a pressure sensitive adhesive, a double-sided tape or a resin layer.

The coverlay CL is disposed in such as being mounted on the third area AR3. As shown in FIG. 3, the coverlay CL is disposed spaced apart from the light sources LS in the first direction DR1 by a first space and to face the light sources LS. In the illustrated exemplary embodiment, the coverlay CL lengthwise extends in the second direction DR2. The adhesive members AD are disposed spaced apart from the coverlay CL in the direction opposite to the first direction DR1 by a second space smaller than the first space. Thus, the coverlay CL faces the adhesive members AD and the light sources LS. The coverlay CL is disposed between the light guide plate LGP and the substrate SUB and contacts the first surface OP-1. The coverlay CL is provided as a film or a double-sided tape, which includes a color material. The color material has a white or black color, but should not be limited thereto or thereby. That is, the coverlay CL may have an adhesive, insulative and/or light-blocking property.

The coverlay CL according to the illustrated exemplary embodiment may have a substantially rectangular parallelepiped shape. Since the coverlayer CL is disposed between the light guide plate LGP and the substrate SUB, leaking of the light through the opposite surface OP, e.g., the third surface OP-3, to outside the light guide plate LGP may be reduced or effectively prevented. The coverlay CL may be otherwise referred to as a light-blocking member since the coverlay CL is disposed between the light guide plate LGP and the substrate SUB to reduce or effectively prevent leaking of the light through the opposite surface OP, e.g., the third surface OP-3, to outside the light guide plate LGP. As such, the coverlay CL may otherwise be referred to as a "light blocking member" having the above-described properties and/or materials.

The coverlay CL has a total or maximum thickness, e.g., a distance extending from the upper surface of the substrate SUB in a direction opposite to the third direction DR3, that is equal to a distance between the first surface OP-1 of the light guide plate LGP and the substrate SUB of the light source unit LU. The above-described thickness of the coverlay CL is greater than a difference between the first distance T1 and the second distance T2 and equal to a value obtained by adding a total or maximum thickness of the adhesive member AD, e.g., the distance thereof extending from the upper surface of the substrate SUB in the direction opposite to the third direction DR3, to the difference between the first distance T1 and the second distance T2. A minimum thickness of the overlayer CL is greater than a maximum thickness of the adhesive member AD and smaller than a maximum thickness of the light source LS, which extends in the direction opposite to the third direction DR3 from the upper surface of the substrate SUB. In the illustrated exemplary embodiment, the coverlay CL is disposed to face the first surface OP-1 of the light guide plate LGP, and thus the difference in thickness of the light guide plate LGP formed by the first and second surfaces OP-1 and OP-2 may be compensated.

Referring to FIGS. 1 and 2 again, the optical sheet OPS is disposed between the display panel DP and the light guide plate LGP. The optical sheet OPS controls the light emitted from the light source LS. The optical sheet OPS includes a diffusion sheet DFS, a prism sheet PS and a protective sheet PRS, which are sequentially stacked on the light guide plate LGP.

The diffusion sheet DFS diffuses the light. The prism sheet PS condenses the light diffused by the diffusion sheet DFS to a direction substantially perpendicular to the plane surface of the display panel DP. The light is perpendicularly incident to the display panel DP after passing through the prism sheet PS. The protection sheet PRS is disposed on the prism sheet PS. The protection sheet PRS protects the prism sheet PS from an external impact. In the illustrated exemplary embodiment, the optical sheet OPS includes one diffusion sheet DFS, one prism sheet PS and one protection sheet PRS, however the invention should not be limited thereto or thereby. In an exemplary embodiment, for instance, at least one of the diffusion sheet DFS, the prism sheet PS and the protection sheet PRS among individual sheets of the optical sheet OPS may be provided in a plural number, and one or more of the individual sheets may be omitted if necessary. Also, the stacking order of the diffusion sheet DFS, the prism sheet PS and the protection sheet PRS may be changed.

The bottom chassis BC accommodates therein the light source unit LU, the light guide plate LGP and the optical sheet OPS. The bottom chassis BC includes or defines a bottom portion BP, a sidewall portion SP and a cover portion CP.

The bottom portion BP faces the display panel DP. The light source unit LU and the light guide plate LGP are disposed on the bottom portion BP. The bottom portion BP includes a first portion BP-1 overlapped with the first surface OP-1 of the light guide plate LGP, a second portion BP-2 accommodating thereon the light source unit LU, and a third portion BP-3 connecting the first portion BP-1 and the second portion BP-2 to each other.

The second portion BP-2 is overlapped with the second surface OP-2 of the light guide plate LGP and at least a portion of both the third surface OP-3 and the first surface OP-1 of the light guide plate LGP.

The third portion BP-3 of the bottom chassis BC faces the third surface OP-3 and is inclined with respect to the first and second portions BP-1 and BP-2. The third portion BP-3 is substantially parallel to the third surface OP-3 of the light guide plate LGP.

A total vertical distance between the upper surface of the first portion BP-1 and the upper surface of the second portion BP-2 may be equal to a value obtained by adding the thickness of the coverlay CL to thickness of the substrate SUB.

The sidewall portion SP of the bottom chassis BC is bent from the bottom portion BP and extends upward in the direction opposite to the third direction DR3. The cover portion CP is bent from the sidewall portion SP and extends to overlap with the second portion BP-2. The cover portion CP is disposed on the light source unit LU to protect the light source unit LU. One among the first, second and third portions BP-1, BP-2 and BP-3 may be extended to define another one among the first, second and third portions BP-1, BP-2 and BP-3.

A portion of the display panel DP is disposed on the cover portion CP. Since the cover portion CP supports the display panel DP, a separate mold frame, which is included in a conventional display device to support the display panel DP, may be omitted. Accordingly, an overall thickness of the display device DD may be reduced by omitting the separate conventional mold frame in favor of the cover portion CP of the invention.

In the illustrated exemplary embodiment, the bottom chassis BC includes a reflective material or has a reflective property. Therefore, a separate reflective sheet of a conventional display device may be omitted. However, in an exemplary embodiment of the invention, the separate reflective sheet (not shown) may be further disposed between the bottom chassis BC and the light guide plate LGP.

Since one or more exemplary embodiment of the display device DD according to the invention includes the coverlay CL, the light leaking from the light guide plate LGP which has the thickness difference may be blocked, and thus display quality of the display device DD may be improved. In addition, since the coverlay CL compensates for the thickness difference of the light guide plate LGP, damage to the display panel DP by an external force may be reduced or effectively prevented.

Figure 5:
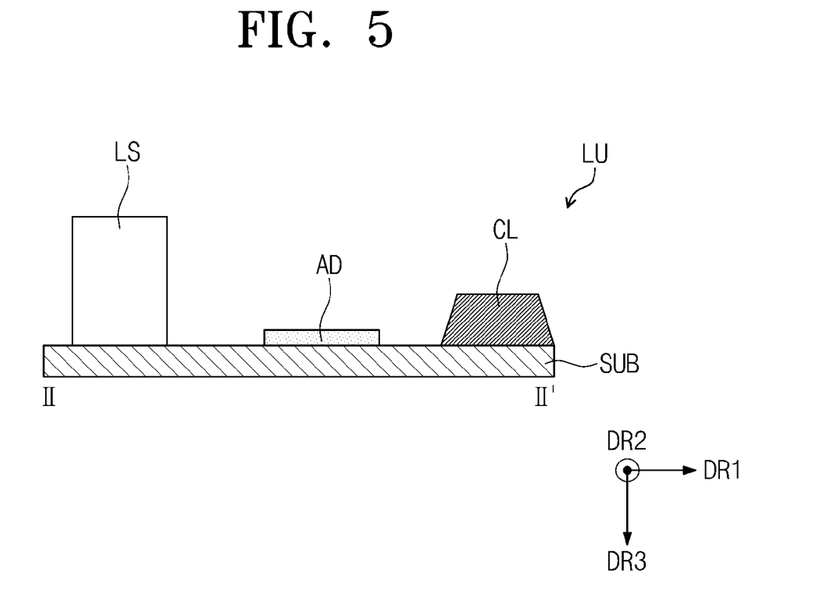
FIG. 5 is a cross-sectional view showing another exemplary embodiment of a light source unit according to the invention.
Figure 6:
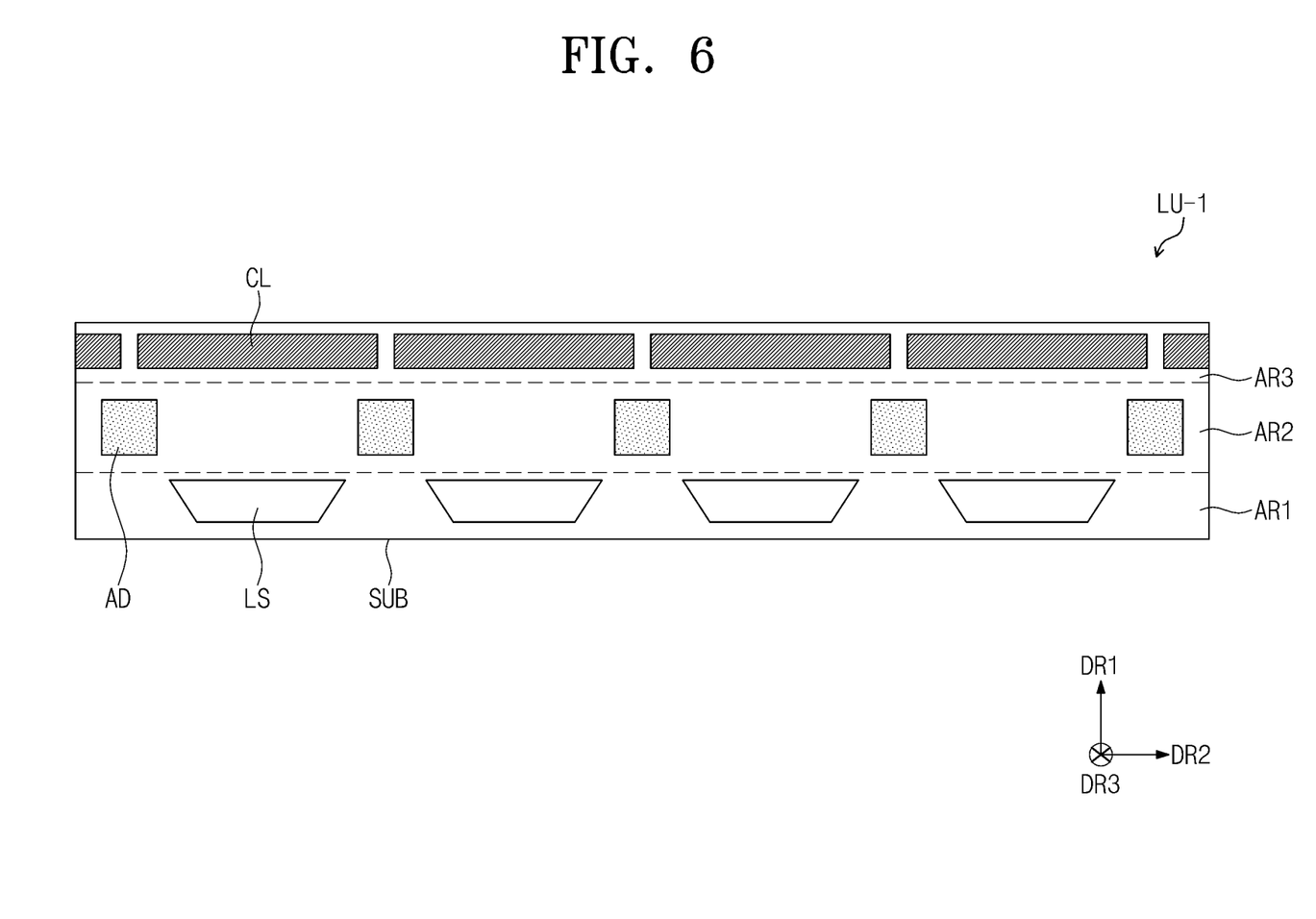
FIG. 6 is a top plan view showing still another exemplary embodiment of a light source unit according to the invention.
Figure 7:
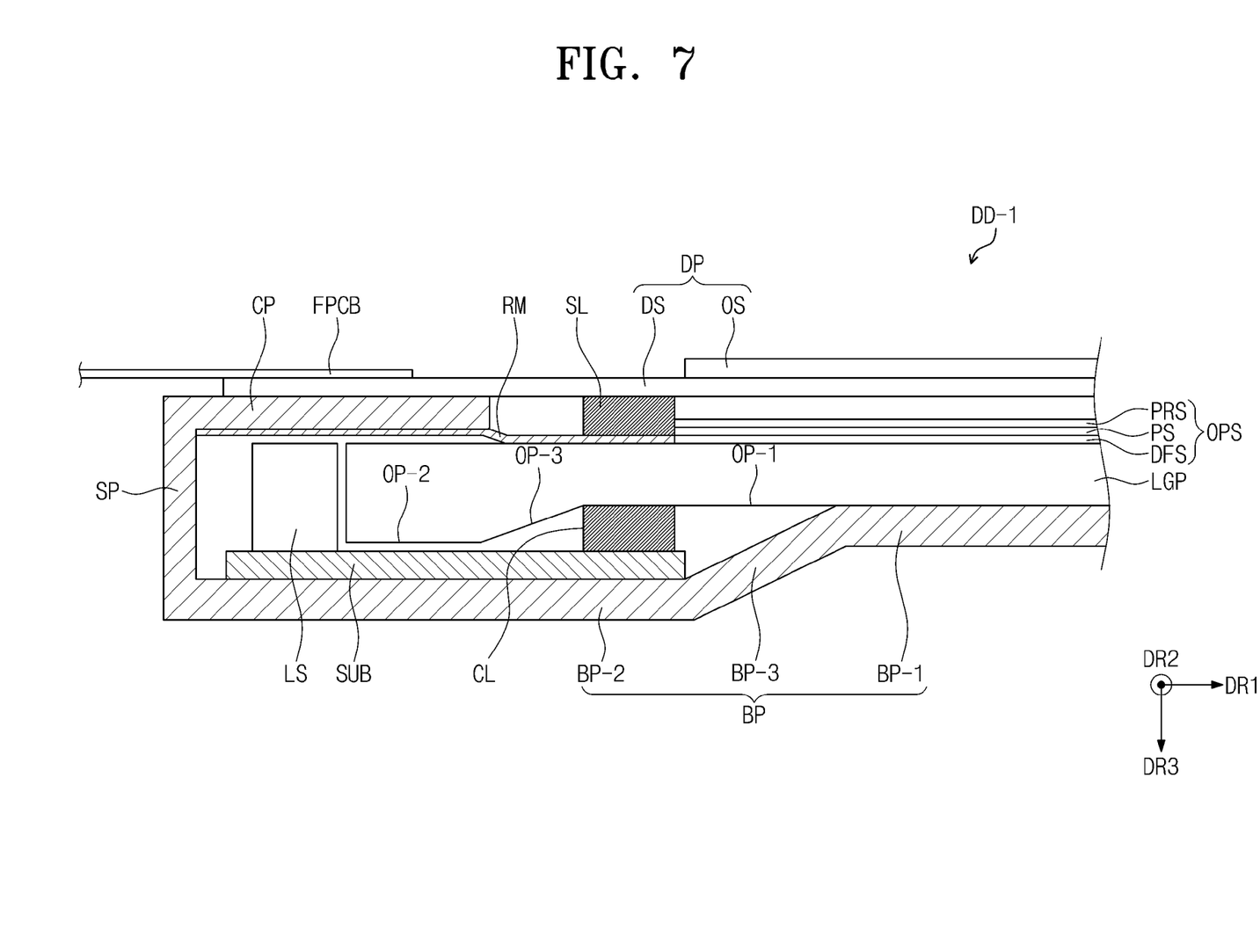
FIG. 7 is a cross-sectional view showing another exemplary embodiment of a display device according to the invention.

Hereinafter, modified exemplary embodiments of light source units will be described with reference to FIGS. 5 to 7. In FIGS. 5 to 7, the same reference numerals denote the same elements in the previously-described embodiments, and thus detailed descriptions of the same elements will be omitted.

FIG. 5 is a cross-sectional view showing another exemplary embodiment of a light source unit according to the invention.

Hereinafter, another exemplary embodiment of a coverlay CL according to the invention will be described in detail with reference to FIG. 5. As shown in FIG. 5, the coverlay CL may have a variety of shapes. When viewed in a cross-section substantially parallel to a plane surface defined by the first and third directions DR1 and DR3, the coverlay CL has a substantially trapezoid shape, in which a bottom surface thereof in the first direction facing the substrate SUB is greater than that of an upper surface thereof in the first direction. Considering the length of the coverlay CL in the second direction DR2, the coverlay CL defines a planar area of the lower surface thereof greater than that of the upper surface thereof which opposes the bottom surface, but the shape of the coverlay CL should not be limited to the trapezoid shape. In an exemplary embodiment, the coverlay CL may have a trapezoid shape, in which the bottom surface thereof facing the substrate SUB defines a planar area smaller than that of the upper surface which opposes the bottom surface. In addition, the coverlay CL should not be limited to a specific shape as long as the coverlay CL is disposed between the light guide plate LGP and the substrate SUB and supports the light guide plate LGP as described above.

FIG. 6 is a plan view showing another exemplary embodiment of a light source unit LU-1 according to the invention.

Hereinafter, another exemplary embodiment of a coverlay CL according to the invention will be described in detail with reference to FIG. 6. As shown in FIG. 6, the coverlay CL may be provided as a discrete coverlay member in a plural number arranged in the second direction. The coverlay members CL are arranged in the third area AR3 in one line along the second direction DR2. In a direction parallel to the first direction DR1, each of the coverlay members CL is disposed to face a corresponding light source LS among the light sources LS and faces the adhesive member AD to overlap a portion thereof.

FIG. 7 is a cross-sectional view showing another exemplary embodiment of a display device DD-1 according to the invention.

Referring to FIG. 7, the display device DD-1 may further include a light blocking member SL and a reflective member RM in addition to the elements of the display device DD shown in FIG. 2.

The light blocking member SL is disposed on the light guide plate LGP. A portion of the light blocking member SL is overlapped with the coverlay CL in the top plan view. The light blocking member SL prevents an external light provided from outside the display device DD-1 from being reflected toward a viewing side of the display device DD-1.

The reflective member RM extends to be disposed on the light source LS and the light guide plate LGP. The reflective member RM may be fixed to a surface of the cover portion CP, which faces the light source unit LU. The reflective member RM may be disposed between the light blocking member SL and the light guide plate LGP. The reflective member RM reflects the light generated by the light source unit LU and leaked from the light guide plate LGP without being incident to the light guide plate LGP, and thus the light reflected by the reflective member RM is incident to the light guide plate LGP.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
   a display panel which receives a light to display an image;
   a light guide plate which guides the light to the display panel; and
   a light source unit which generates and provides the light to the light guide plate, the light source unit disposed at a side surface of the light guide plate and comprising:
   a substrate defining a width thereof in a first direction and a length thereof in a second direction crossing the first direction, the substrate comprising first, second and third areas sequentially arranged in the first direction;
   light sources disposed in the first area and along the second direction;
   an adhesive member disposed in the second area and projected between light sources adjacent to each other among the light sources in a direction opposite to the first direction; and
   a first light blocking member disposed in the third area to face the light sources.

2. The display device of claim 1, wherein the light guide plate defines:
   a light incident surface thereof facing the light sources;
   a light output surface thereof which faces the display panel and from which the light exits the light guide plate; and
   an opposite surface thereof which opposes the light output surface, the opposite surface defining:
   a first surface thereof overlapped with the third area of the substrate and spaced apart from the light output surface by a first distance in a third direction perpendicular to the first and second directions;
   a second surface thereof overlapped with the second area of the substrate and spaced apart from the light output surface by a second distance in the third direction, the second distance greater than the first distance; and
   a third surface connecting the first and second surfaces to each other and inclined with respect to the second surface.

3. The display device of claim 2, further comprising the adhesive member provided in plural separated from each other in the second direction and alternately arranged with the light sources in a zigzag shape in a top plan view.

4. The display device of claim 2, wherein the adhesive member directly contacts the second surface of the opposite surface of the light guide plate.

5. The display devices of claim 4, wherein the first light blocking member directly contacts the first surface of the opposite surface of the light guide plate.

6. The display device of claim 5, wherein the first light blocking member has a thickness equal to a distance between the first surface of the opposing surface of the light guide plate and the substrate of the light source unit.

7. The display device of claim 2, wherein the first light blocking member is a film or a double-sided tape, and comprises a color material.

8. The display device of claim 6, wherein the first light blocking member defines a continuous length thereof which extends in the second direction.

9. The display device of claim 6, further comprising the first light blocking provided in plural arranged in the second direction and spaced apart from each other at regular intervals.

10. The display device of claim 2, further comprising a bottom chassis in which is accommodated the light guide plate and the light source unit.

11. The display device of claim 10, wherein the bottom chassis defines:
   a bottom portion thereof overlapped with the display panel;
   the bottom portion extended bent toward the display panel to define a sidewall portion of the bottom chassis, the bottom portion further defining:

a first portion thereof overlapped with the first surface of the opposite surface of the light guide plate;

a second portion thereof overlapped with the second surface of the opposite surface of the light guide plate and on which is accommodated the light source unit; and a third portion thereof extended between the first and second portions to connect the first and second portions to each other, the third portion inclined with respect to the second portion.

12. The display device of claim 11, wherein the third portion of the bottom chassis faces the third surface of the opposite surface of the light guide plate.

13. The display device of claim 11, wherein the sidewall portion of the bottom chassis is extended bent toward the display panel to define a cover portion of the bottom chassis, the cover portion disposed overlapping the light source unit.

14. The display device of claim 11, wherein the bottom chassis comprises a reflective material.

15. The display device of claim 11, further comprising a second light blocking member disposed on the light guide plate, and wherein at least a portion of the light blocking member is overlapped with the first light blocking member in a top plan view.

16. The display device of claim 15, further comprising a reflective member disposed between the light source unit and the cover portion of the bottom chassis and between the light guide plate and the second light blocking member.

17. A backlight unit comprising:
a light source unit which generates a light;
a light guide plate which receives the light from the light source unit and guides the light to a display panel; and
a bottom chassis in which is accommodated the light source unit and the light guide plate, the light source unit comprising:
a substrate defining a width thereof in a first direction and a length thereof in a second direction crossing the first direction, the substrate comprising first, second and third areas sequentially arranged in the first direction;
light sources disposed in the first area and arranged along the second direction;
an adhesive member disposed in the second area and projected between the light sources adjacent to each other among the light sources in a direction opposite to the first direction; and
a first light blocking member disposed in the third area to face the light sources.

18. The backlight unit of claim 17, wherein
the light guide plate is overlapped with the second and third areas of the substrate,
in a third direction perpendicular to the first and second directions, the light guide plate has a first thickness in the third area and a second thickness in the second area, and
the first thickness of the light guide plate is smaller than the second thickness of the light guide plate.

19. The backlight unit of claim 18, wherein in the third direction, the first light blocking member has a minimum thickness greater than a difference between the first thickness and the second thickness of the light guide plate.

20. A backlight unit comprising:
a substrate defining a width thereof in a first direction and a length thereof in a second direction crossing the first direction;
light sources mounted on the substrate and arranged in the second direction and spaced apart from each other, each light source generating light and emitting the light in the first direction;
a first light blocking layer disposed spaced apart from the light sources in the first direction by a first distance and facing the light sources; and
an adhesive member provided in plural arranged in the second direction and spaced apart from each other, the adhesive members disposed spaced apart from the first light blocking layer in a direction opposite to the first direction by a second distance smaller than the first distance, and alternately arranged with the light sources in a zigzag shape.

21. The backlight unit of claim 20, wherein in a third direction perpendicular to the first and second directions, from an upper surface of the substrate,
a thickness of the light blocking member is greater than a thickness of each of the adhesive members and smaller than a thickness of each light source.

* * * * *